Oct. 4, 1932.  T. M. WILKINS  1,881,007
AUTOMATIC REGULATOR
Filed April 8, 1930
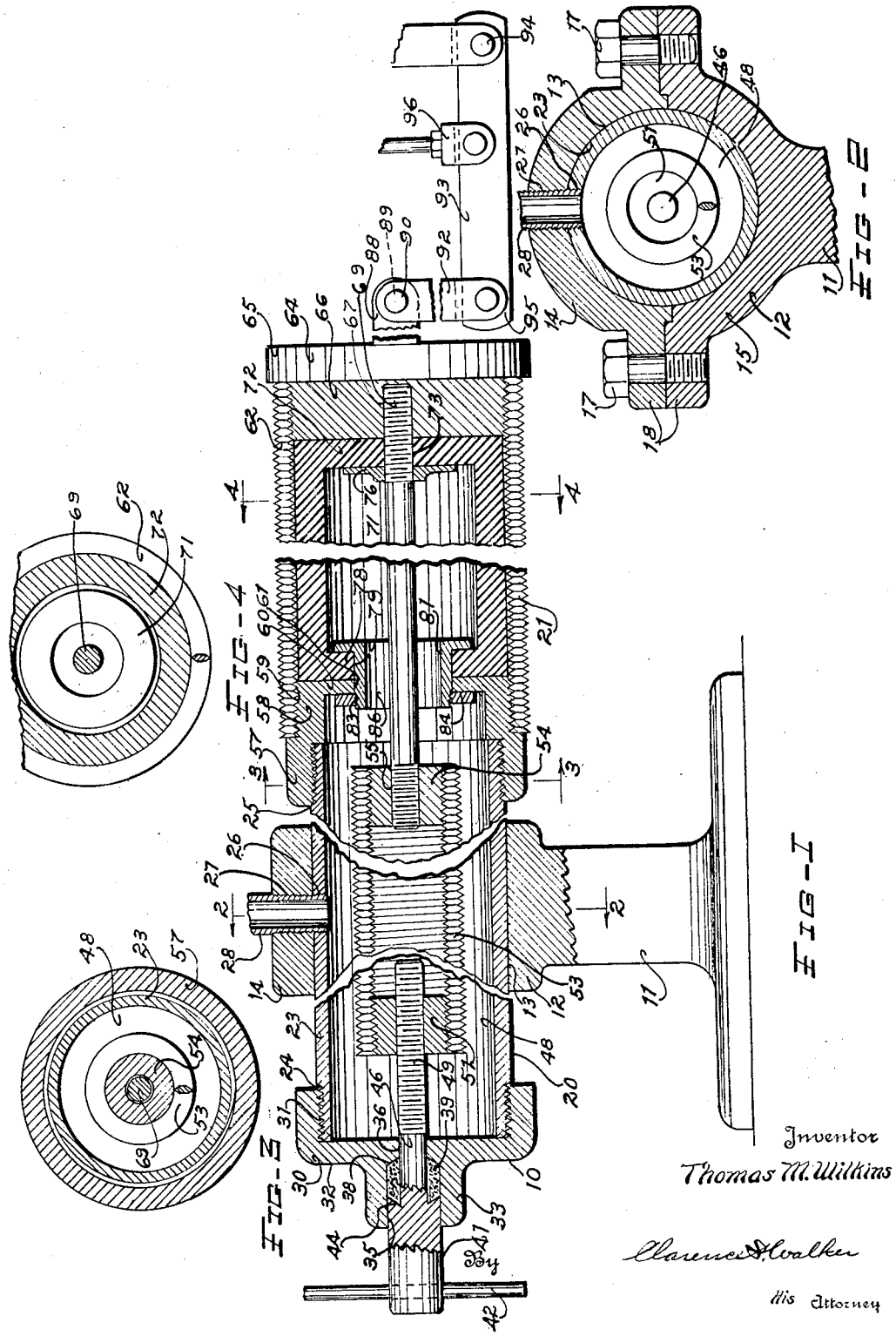
Inventor
Thomas M. Wilkins
Clarence H. Walker
His Attorney Patented Oct. 4, 1932

1,881,007

UNITED STATES PATENT OFFICE

THOMAS M. WILKINS, OF GARLAND, PENNSYLVANIA, ASSIGNOR TO JENNY D. FALCONER, OF JAMESTOWN, NEW YORK

AUTOMATIC REGULATOR

Application filed April 8, 1930. Serial No. 442,712.

This invention relates to an improvement in an automatic regulator and more particularly to the method and means for regulating pressures to control fuel consumption, the flow of a volatile liquid or to control the flow of solids.

This invention is adapted for application to control and regulate the steam pressure of boilers fed by steam, air, gas, oil or any volatile liquid; to control furnace draft of boilers, stokers, water pumps or other pumps using pressure for steam, air, gas or any volatile liquid, or to control the flow of solids.

Other and further objects of this invention will appear from a consideration of the following specification when taken in conjunction with the accompanying drawing which forms a part thereof, and in which Fig. 1 is a longitudinal sectional view of a regulator embodying one form of this invention;

Fig. 2 is a sectional view taken substantially on the line 2—2 of Figure 1 and shows the pressure inlet as well as the method of mounting the regulator;

Fig. 3 is a sectional view taken substantially on the line 3—3 of Figure 1; and

Fig. 4 is a further sectional view taken on the line 4—4 of Figure 1.

Referring to the drawing and particularly to Figure 1 thereof, it will be noted that the regulator is set horizontally, one end being rigidly attached to and supported by a pedestal, while the other end is free in order that it may move or drop by force of gravity under certain conditions hereinafter to be set forth.

The regulator designated generally by the reference numeral 10 is mounted upon a pedestal 11. The pedestal is formed with a collar-like member 12 provided with a centrally disposed annular opening 13. The upper portion 14 of the collar is removably joined to the fixed portion 15 by means of bolts 17 which pass through flanges 18.

The regulator 10 may be, for the purpose of description, considered to be formed in two elements, namely, the rigid element 20 and the flexible element 21. The element 20 comprises a section of tubing 23 having external threads 24 and 25 formed at each end thereof. In the upper face of the tubing is a drilled and tapped opening 26 and concentrically located with relation to the opening 26, is an opening 27 in the portion 14 of the collar 12. The opening 27 is tapped and forms a continuation of the opening 26 when the tubing 23 is mounted within the collar 12. A pipe 28, threaded at its lower end, is engaged with the tubing 23 and collar 12. The pipe 28, although primarily acting as a pressure inlet to the regulator, also constitutes the means of keying the tubing 23 to the collar 12 to prevent relative movement of these elements.

One end of the tubing 23 is closed by an exterior plug 30, said plug having internal threads 31 which engage the threads 24 of the tubing. Centrally of and extending outwardly from the face 32 of said plug is a boss 33. Projecting inwardly from the end of the boss 33 is an opening 35. A smaller opening 36, beginning from the inner face of the plug 30, connects with the opening 35. The connecting shoulder 38, of the openings 35 and 36, is sloped to engage packing 39. Supported within the opening 35 is a rod 41, the outer end of which is fitted with a suitable handle or turning pin 42. The rod 41, at a point within the opening 35, is of a reduced diameter and the connecting shoulder 44 is inwardly sloped to form a seat for the packing 39. The reduced portion 46 of the rod 41 extends into the space 48 within the tubing 23 and is formed with threads 49 substantially its full length. Mounted upon and in threaded engagement with the portion 46 of the rod is a block 51. The outer face of this block is formed with threads which are engaged by a closely coiled, substantially flat walled, spring 53. The opposite end of the spring 53 is threadedly engaged with a block 54, similar to the block 51, and through which a threaded opening 55 is made. Engaging the threads 25 of the tubing 23 is a collar 57. A considerable portion of the collar 57 extends beyond the end of the tubing 23. This portion 58 is formed with external threads 59 and terminates in an inwardly extending annular shoulder 60 through which an opening 61 is made.

The above constitutes the complete structure of the rigid element 20. The flexible element 21 comprises a flat walled closely coiled spring 62 which is mounted upon the collar 57 through engagement with the threads 59. At the outer end of the spring 62 and closing said end is a plug 64. The underface of the head 65 of this plug abuts the spring 62 and the reduced portion 66 is formed with threads which engage the coils of the spring. A drilled and tapped opening 67 is formed in the portion 66 of the plug and a rod 69 is threadably engaged with the portion 66. The rod 69, at its end remote from the plug 64, is threaded to engage the block 54, located within the tubing 23 which forms part of the rigid element 20.

Mounted between the shoulder 60 and the inner face of the plug 64 is a flexible compartment 71 formed preferably from rubber or a suitable compound of rubber and other substances. The compartment 71, adjacent the plug 64, terminates in a wall 72. A centrally located opening 73 is formed in the wall, the diameter of which is sufficient to permit the passage therethrough of the rod 69. The threads, adjacent this end of the rod, are continued into the space 74 within the compartment 71 and a small collar 76 is threadably engaged with said rod. Rotation of the collar 76 upon the rod 69 causes said collar to compress the wall 72 between it and the portion 66 of the block 64. By this means it is impossible for any fluid contained within the compartment 71 to escape from the regulator around the rod 69 and between the wall 72 and plug 64.

The inner end of the compartment 71 terminates in a wall 78 abutting the shoulder 60 and in which is formed an opening 79 of a diameter substantially that of the opening 61 in said shoulder. A sleeve 81, having flanges 82 bearing against the inner face of the wall 78, extends outwardly through said wall, the shoulder 60 and toward the fixed element 20. This end of the sleeve is formed with external threads 83 which are engaged by a nut 84. By turning the nut 84 upon the sleeve, said sleeve is moved to compress the compartment wall 78 thus creating a complete seal of said wall with the shoulder 60 in order to prevent escape of fluid contained within the regulator. The opening 86, in the sleeve 81, while permitting the passage therethrough of the rod 69, is of a sufficient diameter to permit any sidewise movement of said rod during operation of the regulator, without said rod contacting with the wall of said opening.

Secured to or formed integral with the head 65 of the plug 64, is a horizontally extending arm 88. The length of the arm 88 may be varied according to the amount of movement required of the regulator to operate any system to which it may be attached. It is obvious that by increasing the length of the arm 88 any movement of the flexible element 21 of the regulator will be greatly magnified at the end of the arm. An opening 89 is formed in the arm 88 in which a pin 90 is mounted. Supported by the pin 90 is a link 92 which in turn is pivotally connected with a lever 93. The lever 93 is supported by a pivot 94. Between the pivoted end 94 and the free end 95 of the lever, is an actuating member 96. The member 96 may be connected with a furnace draft, furnace fuel valve or any other device with which the regulator is to be used. Inasmuch as the method of connecting up the member 96 to do the work required is comparatively simple, no structure is shown for the reason that this structure varies with each regulator installation.

For the purpose of describing the operation of the regulator, it is assumed that the pipe 28 is connected with a steam boiler and that it is desired to maintain a steam pressure of two hundred pounds through the use of the regulator. The regulator is completely filled with water. The member 96 is connected either with a valve which controls the fuel supply by which the boiler is heated or, if coal is used, with an automatic stoker or to regulate the drafts of the coal burning heating unit. As the pressure is built up within the boiler, said pressure is likewise built up within the regulator, not only in the space 48 of the fixed element but also in the space 74 of the flexible element. Increasing the pressure within the regulator tends to force the flexible element 21 away from the fixed element 20 by stretching or separating the coils of the springs 53 and 62. When the steam within the boiler passes two hundred pounds pressure, said pressure will have caused the springs 53 and 62 to become slightly extended and the outer end of the flexible element 21, now being too heavy to remain supported by the springs 53 and 62 in horizontal alignment with the fixed element 20, drops by force of gravity. Obviously, the outer or unsupported end of the regulator moves considerably farther than the portion of the element 21 adjacent the collar 57. It may be readily understood that if the arm 88 is of a considerable length beyond the end of the regulator, said arm will drop a greater distance thus causing the lever 93, through the link 92, to draw, downwardly, the member 96. If the member 96 be connected with the fuel valve, said valve will be partially closed, the fire under the boiler reduced and the pressure within said boiler allowed to dispel.

As the pressure within the boiler diminishes, the pressure within the regulator is likewise diminished and since the springs 53 and 62 have been distorted and caused to move out of their normal position, upon the relief of pressure within the regulator, said springs will return to their normal position substantially as shown in the drawing. When this occurs, the member 96 opens the fuel valve and the burner once more increases the steam pressure within the boiler.

Since with every installation of this regulator and every different application of use, varying limits of pressure must be had, the regulator is provided with an adjustment by which any pressure, however slight, will cause it to operate. This adjustment is made possible with the use of the spring 53, rods 41 and 69 and the control handle 42. When the handle 42 is turned in a clockwise direction, the block 51 is caused to move toward the plug 30, thus expanding the spring 53 and creating a tension between the ends of the regulator. With this increased pressure to hold the coils of the springs 62 together, it is obvious that an increased pressure within the regulator is necessary to extend the coils of the springs 53 and 62 sufficiently for the flexible element 21 to drop under force of gravity. By turning the handle 42 in a counter-clockwise direction, the block 51 is moved toward the end of the rod 41 thus relieving the tension of the spring 53. The end of the flexible element 21 therefore is only held by the normal tension of the spring 62 and upon the application of pressure to the regulator, the springs 53 and 62 will readily extend causing the flexible elements to elongate and drop by force of gravity.

The device above described, due to its sensitivity may be made use of in any system regardless of the pressure variation limits, inasmuch as the sensitivity of the regulator is governed by the variable tension of the spring 53.

While only one embodiment of this invention has been shown and described, applicant is not limited thereto since it is obvious that other modifications or embodiments can be made without departing from the spirit and scope of the invention as set forth in the hereunto annexed claims.

Having thus set forth my invention what I claim as new and for which I desire protection by Letters Patent is:

1. In a horizontal gravity pressure regulator for systems, a supported tube, a collar closing one end of said tube, a pressure connection entering said tube, a collar attached to the other end of said tube, a flexible element joined to said collar, and means connecting the remote ends of said tube and said flexible element, said means being adapted to variably control the flexibility of said flexible element.

2. In a horizontal gravity pressure regulator for systems, a tube, a plug closing one end of said tube, a collar mounted on the other end of said tube, a flexible cylindrical element engaged with said collar, another plug closing the free end of said flexible element, and flexible means connecting said first plug with said other plug.

3. In a horizontal gravity pressure regulator for systems, a tube, a plug closing one end of said tube, a pressure inlet pipe in said tube, a flexible element connected with said tube, an expansible container mounted in said element, a plug closing the free end of said element, and means adapted to variably control the flexibility of said flexible element.

4. In a horizontal gravity pressure regulator for systems, a supported tube, a spiral coiled spring joined to one end of said tube, an expansible container in said spring, plugs closing remote ends of said tube and said spring, and means adapted to variably control the flexing of said spring.

5. In a horizontal gravity pressure regulator for systems, a supported tube, a spiral coiled spring, a collar connecting said spring with said tube, plugs closing the remote ends of said tube and said spring, an expansible container in said spring, said container opening into said tube, rods carried by said plugs and flexible means connecting said rods.

6. In a horizontal gravity pressure regulator for systems, a tube, a closely coiled spring, a collar connecting said spring with said tube, plugs closing the remote ends of said tube and said spring, a manually rotatable rod carried by one of said plugs and projecting into said tube, another rod carried by the other of said plugs, and a spring carried by and connecting said rods.

7. In a horizontal gravity pressure regulator for systems, a tube, a closely coiled spring connected with said tube, an expansible container in said spring, plugs closing the remote ends of said tube and said springs, an adjustable rod carried by one of said plugs, said rod projecting into said tube, a nut threaded on said plugs, said last named rod extending through said spring into said tube, a nut threaded on said rod, and a spiral spring carried by said nut and flexibly connecting said rods together.

In testimony whereof I have affixed my signature.

THOMAS M. WILKINS.